(12) United States Patent
Bhatia et al.

(10) Patent No.: US 9,111,089 B1
(45) Date of Patent: Aug. 18, 2015

(54) SYSTEMS AND METHODS FOR SAFELY EXECUTING PROGRAMS

(75) Inventors: Yadvinder Bhatia, Punjab (IN); Anand Sankruthi, Chennai (IN)

(73) Assignee: Symantec Corporation, Mountain View, CA (US)

( * ) Notice: Subject to any disclaimer, the term of this patent is extended or adjusted under 35 U.S.C. 154(b) by 260 days.

(21) Appl. No.: 13/023,162

(22) Filed: Feb. 8, 2011

(51) Int. Cl.
 *G06F 21/00* (2013.01)
 *G06F 21/55* (2013.01)

(52) U.S. Cl.
 CPC ............. *G06F 21/55* (2013.01); *G06F 21/00* (2013.01)

(58) Field of Classification Search
 CPC ...................................................... G06F 21/00
 USPC .......................................................... 726/22
 See application file for complete search history.

(56) References Cited

U.S. PATENT DOCUMENTS

| | | | |
|---|---|---|---|
| 7,953,833 B2* | 5/2011 | Ben-Shaul et al. ........... 709/222 |
| 2006/0212931 A1* | 9/2006 | Shull et al. ..................... 726/10 |
| 2010/0005291 A1* | 1/2010 | Hulten et al. ................. 713/156 |
| 2011/0047613 A1* | 2/2011 | Walsh ............................ 726/16 |
| 2011/0145926 A1* | 6/2011 | Dalcher et al. ................. 726/26 |

OTHER PUBLICATIONS

William E. Sobel; U.S. Appl. No. 12/858,085; Systems and Methods for Digitally Signing Executables with Reputation Information; Aug. 17, 2010.

* cited by examiner

*Primary Examiner* — David X Yi
*Assistant Examiner* — Sibte Bukhari
(74) *Attorney, Agent, or Firm* — ALG Intellectual Property, LLC

(57) ABSTRACT

A computer-implemented method for safely executing programs may include identifying an attempt to launch an executable file. The computer-implemented method may also include identifying a reputation associated with the executable file. The computer-implemented method may further include determining, based on the reputation, that the executable file is not trusted. The computer-implemented method may additionally include, in response to determining that the executable file is not trusted, fulfilling the attempt by sandboxing a process instantiated from the executable file. Various other methods, systems, and computer-readable media are also disclosed.

20 Claims, 6 Drawing Sheets

SYSTEMS AND METHODS FOR SAFELY EXECUTING PROGRAMS

BACKGROUND

Consumers and businesses face a growing tide of malicious software that threatens the stability and performance of their computers and the security of their data. Computer programmers with malicious motivations have created and continue to create viruses, Trojan horses, worms and other programs in an attempt to compromise computer systems. These malicious programs are often referred to as malware. In an attempt to evade detection, malicious programmers may inject malware into or among legitimate programs.

One approach to protect a computing system from many of the undesired effects of malware is to run programs on the computing system within a virtualized environment (i.e., to "sandbox" the programs). A sandboxed program that contains malware may be prevented from making changes to the system that effect the operation of other programs and/or the system as a whole. Unfortunately, this approach may suffer from various drawbacks. For example, sandboxing may consume additional system resources and/or reduce application interoperability. Accordingly, the present disclosure addresses a need for additional and improved systems and methods for safely executing programs.

SUMMARY

As will be described in greater detail below, the instant disclosure generally relates to systems and methods for safely executing programs. Systems and methods described herein may safely execute programs by dynamically sandboxing untrusted programs (e.g., at runtime) based on the reputation of each program. For example, a method may include identifying an attempt to launch an executable file, identifying a reputation associated with the executable file, determining, based on the reputation, that the executable file is not trusted, and then, in response to determining that the executable file is not trusted, fulfilling the attempt by sandboxing a process instantiated from the executable file.

The systems described herein may identify the reputation of the executable file in any suitable manner. For example, these systems may transmit an identification of the executable file to a server that includes a reputation database for executable files and then receive the reputation of the executable file from the server. In some examples, identifying the reputation may include identifying community-generated reputation data associated with the executable file.

Sandboxing the process may include any of a variety of steps. In some examples, sandboxing the process may include intercepting one or more attempts by the process to change a system state (such as an attempt to modify a system registry or a file), making a record of the attempted change, intercepting at least one subsequent attempt by the process to inspect the system state, and then fulfilling the subsequent attempt to inspect the system state with the record of the attempted change. Additionally or alternatively, sandboxing the process may include creating a virtual file that records at least one system change performed by the process. In some examples, the systems described herein may also sandbox one or more calls to one or more libraries invoked by the process as a part of sandboxing the process.

In some examples, sandboxing the process may involve sandboxing the process alone and not any other process. Additionally or alternatively, sandboxing the process may entail sandboxing the process without sandboxing any process instantiated from trusted executable files launched from the same operating environment as the executable file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
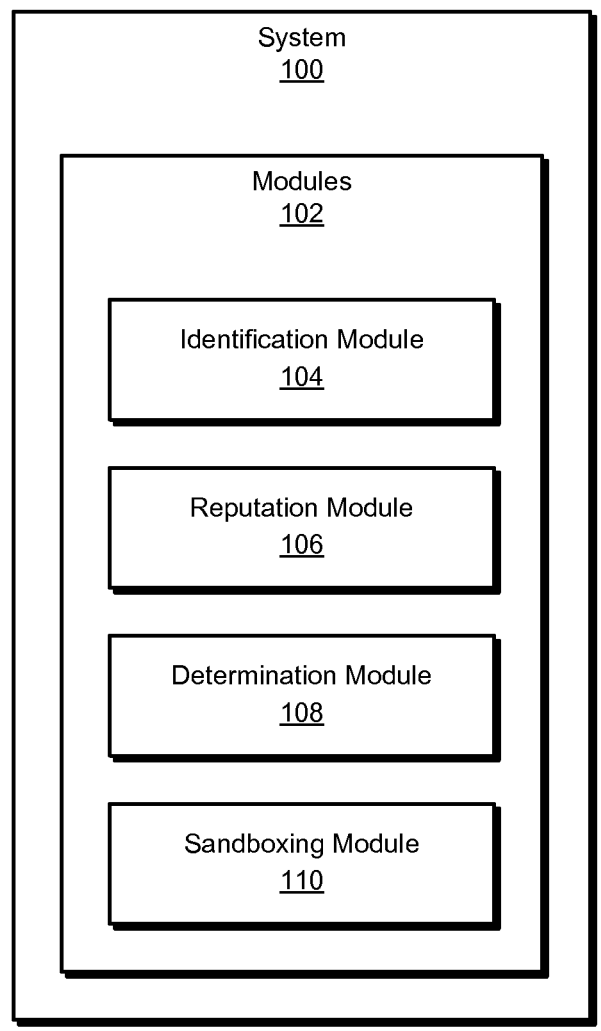
FIG. 1 is a block diagram of an exemplary system for safely executing programs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for safely executing programs. Systems and methods described herein may safely execute programs by dynamically sandboxing untrusted programs (e.g., at runtime) based on the reputation of each program. By dynamically sandboxing untrusted programs based on their reputation, these systems and methods may provide protection against malware as needed without sandboxing an entire system (thereby potentially consuming more computing resources) or modifying applications (e.g., by repackaging them as virtualized applications). Accordingly these systems and methods may automatically and dynamically provide sandboxing for programs as needed without performing unnecessary virtualization operations.

Figure 2:
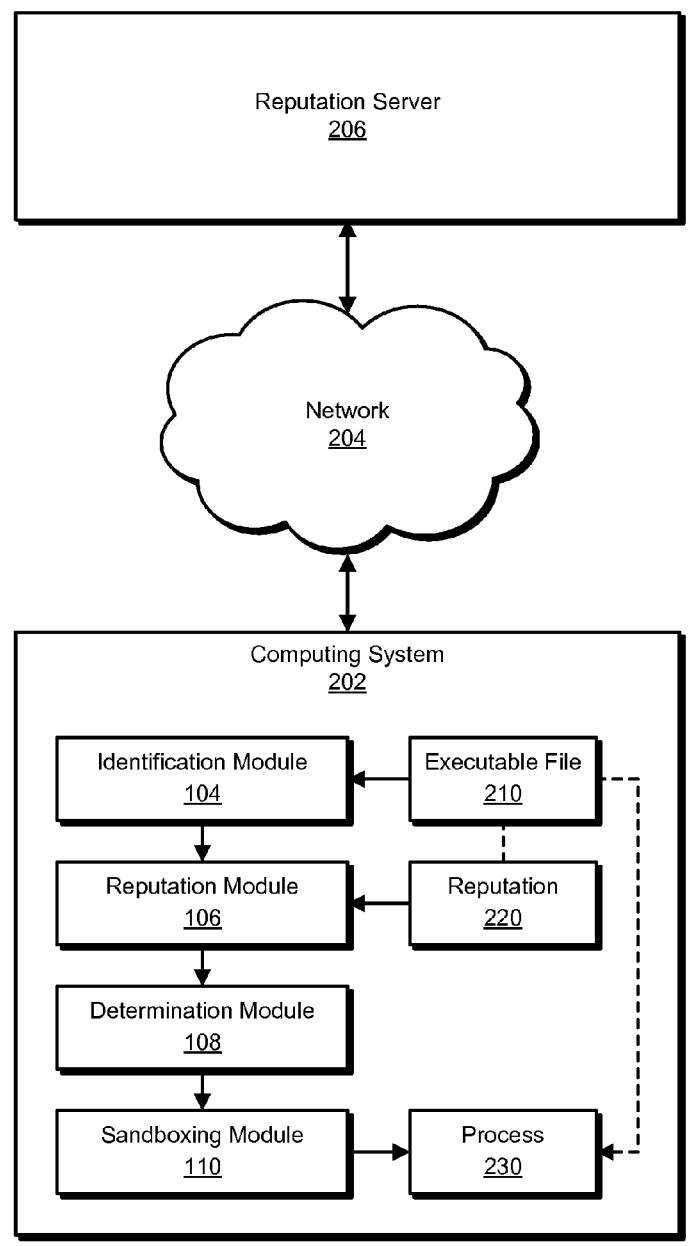
FIG. 2 is a block diagram of an exemplary system for safely executing programs.
Figure 3:
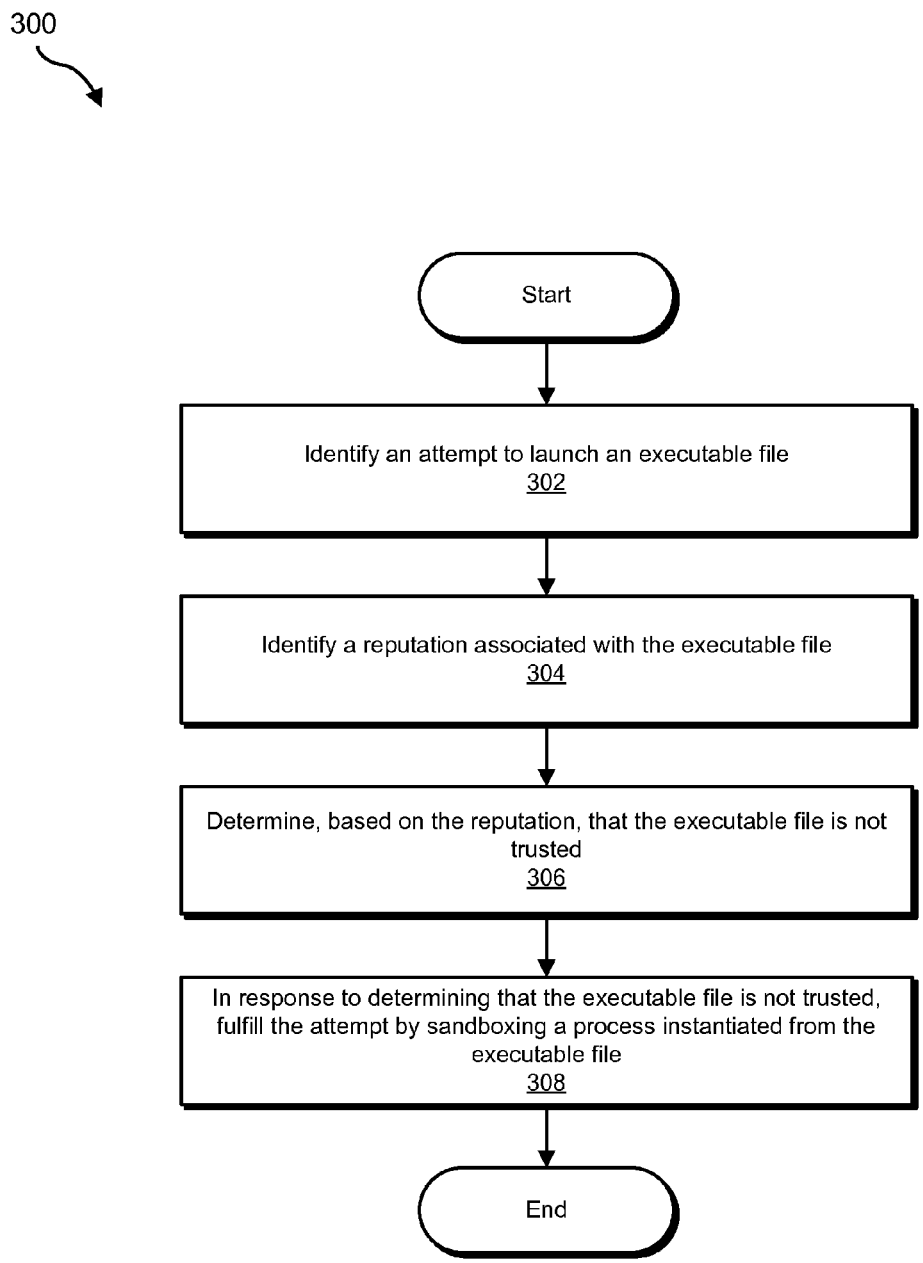
FIG. 3 is a flow diagram of an exemplary method for safely executing programs.
Figure 4:
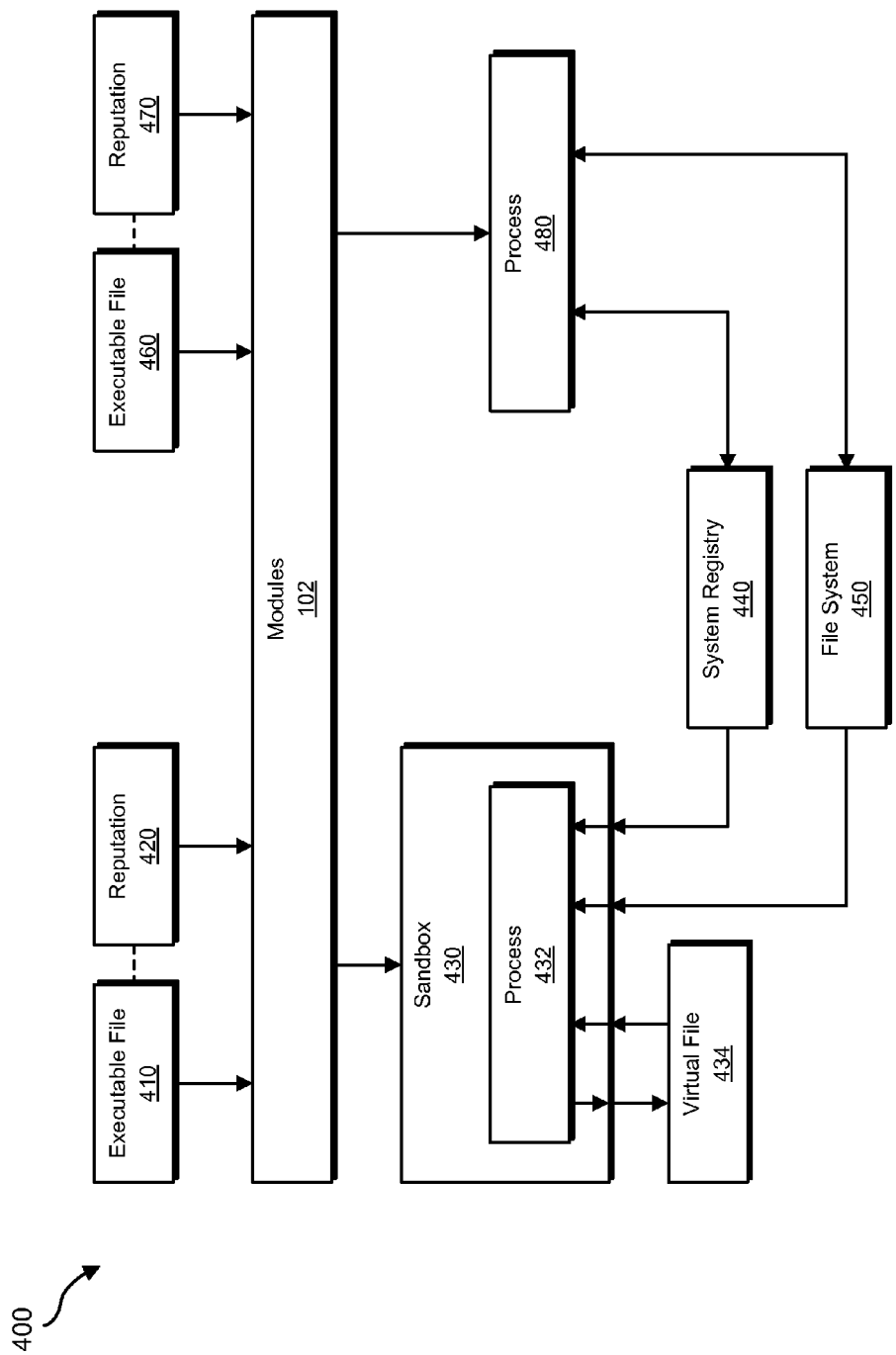
FIG. 4 is a block diagram of an exemplary system for safely executing programs.

The following will provide, with reference to FIGS. 1, 2, and 4, detailed descriptions of exemplary systems for safely executing programs. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for safely executing programs. As illustrated in this figure, exemplary system 100 may include one or more modules 102 for performing one or more tasks. For example, and as will be explained in greater detail below, exemplary system 100 may include an identification module 104 programmed to identify an attempt to launch an executable file. Exemplary system 100 may also include a reputation module 106 programmed to identify a reputation associated with the executable file. Exemplary system 100 may additionally include a determination module 108 programmed to determine, based on the reputation, that the executable file is not trusted.

In addition, and as will be described in greater detail below, exemplary system 100 may include a sandboxing module 110 programmed to, in response to determining that the executable file is not trusted, fulfill the attempt by sandboxing a process instantiated from the executable file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or reputation server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 needing protection from malware in communication with a reputation server 206 via a network 204. In one embodiment, and as will be described in greater detail below, computing system 202 may include identification module 104, reputation module 106, determination module 108, and sandboxing module 110.

Identification module 104 may be programmed to identify an attempt to launch an executable file 210. Reputation module 106 may be programmed to identify a reputation 220 associated with executable file 210 (e.g., by retrieving reputation 220 from reputation server 206). Determination module 108 may be programmed to determine, based on reputation 220, that executable file 210 is not trusted. Sandboxing module 110 may be programmed to, in response to the determination that executable file 210 is not trusted, fulfill the attempt by sandboxing a process 230 instantiated from executable file 210.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Reputation server 206 generally represents any type or form of computing device that is capable of providing reputation data relating to one or more programs. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and reputation server 206.

FIG. 3 is a flow diagram of an exemplary computer-implemented method 300 for safely executing programs. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify an attempt to launch an executable file. For example, at step 302 identification module 104 may, as part of computing system 202 in FIG. 2, identify an attempt to launch executable file 210.

As used herein, the phrase "executable file" may refer to any set of one or more computer-executable instructions. Examples of executable files include portable executable files, native executable files, bytecode files executed with the assistance of an interpreter, and/or script files.

Identification module 104 may perform step 302 in any suitable manner. For example, identification module 104 may identify the attempt to launch the executable file by interfacing with an application programming interface of an operating system in which the executable file is launched. In some examples, identification module 104 may operate as part of a daemon configured to monitor an operating system for attempts to launch executable files. In some examples, identification module 104 may also intercept and/or suspend the attempt to launch the executable file (until, e.g., the systems described herein determine whether to sandbox a process instantiated from the executable file).

FIG. 4 illustrates an exemplary system 400 for safely executing programs. As shown in FIG. 4, system 400 may include an executable file 410. Using FIG. 4 as an example, identification module 104 (as part of modules 102) may identify an attempt to launch executable file 410.

Returning to FIG. 3, at step 304 one or more of the systems described herein may identify a reputation associated with the executable file. For example, at step 304 reputation module 106 may, as part of computing system 202 in FIG. 2, identify reputation 220 associated with executable file 210. Using FIG. 4 as an additional example, reputation module 106 may identify a reputation 420 associated with executable file 410.

The term "reputation," as used herein, generally refers to information that conveys the opinion of a specific community (such as the user base of a security-software publisher) on the trustworthiness or legitimacy of an executable file, software publisher, and/or file source (such as a web domain or download link). Examples of reputation information include, without limitation, reputation scores (where, for example, high reputation scores indicate that a file, software publisher, or file source is generally trusted within a community and low reputation scores indicate that a file, software publisher, or file source is generally untrusted within a community), prevalence information (e.g., information that identifies the number or percentage of user devices within a community that contain (1) an instance of a particular file, (2) files provided by a particular software publisher, and/or (3) files obtained from a particular file source, such as a web domain), or any other information that may be used to identify a community's opinion on the trustworthiness or legitimacy of a file, software publisher, and/or file source.

Reputation module 106 may identify the reputation of the executable file in a variety of ways. For example, reputation module 106 may transmit an identification of the executable file (e.g., a fingerprint of the executable file generated with a hash function, identifying metadata associated with the executable file, etc.) to a server that hosts a reputation database for executable files. Reputation module 106 may then receive the reputation of the executable file from the server. In some examples, reputation module 106 may receive reputation information relating to the executable file from the server (e.g., the reputation of a software publisher of the executable file, the reputation of a source of the executable file, etc.). As mentioned earlier, the reputation of the executable file may be community-generated. For example, the server that hosts the reputation database may receive information from various clients regarding the executable file, the publisher of the executable file, and/or the source of the executable file.

In some examples, reputation module 106 may identify the reputation of the executable file by retrieving cached reputation data relating to the executable file. For example, the reputation of the executable file may have been previously retrieved from a reputation server and then stored locally as metadata for the executable file.

Returning to FIG. 3, at step 306 one or more of the systems described herein may determine, based on the reputation, that the executable file is not trusted. For example, at step 306 determination module 108 may, as part of computing system 202 in FIG. 2, determine that executable file 210 is not trusted based on reputation 220. Using FIG. 4 as an additional example, determination module 108 may determine that executable file 410 is not trusted based on reputation 420.

Determination module 108 may perform step 306 in any suitable manner. For example, determination module 108 may determine that the executable file is not trusted because a reputation score of the executable file fails to meet a predetermined threshold. In some examples, determination module 108 may use the reputation in concert with other information relating to the executable file to determine that the executable file is not trusted. For example, in addition to the reputation of the executable file, determination module 108 may use other potential malware indicators, such as suspicious signatures present in the executable file and/or the context in which the attempt to launch the executable file was made (e.g., whether the executable file was selected from an application menu, a web browser attempted to launch the executable file, the executable file was part of a list of programs to launch on startup, etc.). Generally, determination module 108 may use any suitable algorithm or formula incorporating the reputation of the executable file to determine that the executable file is not trusted.

Returning to FIG. 3, at step 308 one or more of the systems described herein may, in response to determining that the executable file is not trusted, fulfill the attempt to launch the executable file by sandboxing a process instantiated from the executable file. For example, at step 308 sandboxing module 110 may, as part of computing system 202 in FIG. 2, sandbox process 230 instantiated from executable file 210. Using FIG. 4 as an additional example, sandboxing module 110 may create a sandbox 430 for a process 432 instantiated from executable file 410.

As used herein, the term "sandboxing" may refer to any method for virtualizing changes made by a process. For example, sandboxing may entail preventing a process from directly accessing one or more system resources. In some examples, sandboxing may include exposing one or more virtual resources (e.g., a virtual storage device) to a process that represent one or more corresponding system resources removed from the view of the process. Additionally or alternatively, sandboxing may include imposing one or more filters on interactions between a process and a system resource (e.g., checking for and blocking potentially malicious interactions). In some examples, sandboxing may include imposing one or more limitations on interactions between a process and a system resource (e.g., the extent to which the process may consume the system resource). In some examples, sandboxing a process may functionally isolate the process from one or more other processes (e.g., preventing communication between the process and other processes, preventing the process from affecting the state of other processes, etc.).

As used herein, the term "process" may refer to a program in execution (e.g., an instantiation and/or running copy of a program expressed by an executable file). In some examples, the process may include multiple processes, threads, and/or subprocesses. Sandboxing module 110 may also sandbox these processes, threads, and/or subprocesses as part of sandboxing the process.

Sandboxing module 110 may perform step 308 in a variety of ways. For example, sandboxing module 110 may sandbox the process by intercepting one or more attempts by the process to change a system state. For example, sandboxing module 110 may intercept an attempt by the process to modify a system registry. In this example, sandboxing module 110 may intercept each and every attempt by the process to modify the system registry. Alternatively, sandboxing module 110 may intercept some attempts by the process to modify the system registry (e.g., sensitive settings within the system registry) while allowing other attempts by the process to modify the system registry (e.g., creating settings that pertain only to the application represented by the executable file). In another example, sandboxing module 110 may sandbox the process by intercepting one or more attempts to modify a file. In this example, sandboxing module 110 may intercept each and every attempt by the process to modify a file. Alternatively, sandboxing module 110 may intercept only certain attempts by the process to modify a file (e.g., system files, files pertaining to other applications, etc.) and/or may allow only certain attempts by the process to modify a file (e.g., files that pertain only to the application represented by the executable file) while intercepting all other attempts. Generally, sandboxing module 110 may intercept attempts to modify any portion of a computing system running the process (e.g., configuration settings, data files, executable files, etc.) that may affect the state of the computing system and/or any application within the computing system.

Once sandboxing module 110 intercepts an attempt by the process to change a system state, sandboxing module 110 may make a record of the attempted change. Sandboxing module 110 may then intercept one or more subsequent attempts by the process to inspect the system state and fulfill the subsequent attempt to inspect the system state with the record of the attempted change.

Using FIG. 4 as an example, the systems described herein may have determined that executable file 410 is untrusted based on its reputation 420. Accordingly, sandboxing module 110 may sandbox process 432 instantiated from executable file 410 in sandbox 430. Sandboxing module 110 may, with sandbox 430, intercept any attempt by process 432 to write to a system registry 440 or a file system 450. Sandboxing module 110 may record these attempts, and, where possible, fulfill subsequent attempts by the process to inspect system registry 440 or file system 450 with the record.

Returning to step 308, in some examples sandboxing module 110 may sandbox the process by creating a virtual file that records one or more system changes performed by the process. For example, sandboxing module 110 may redirect attempts by the process to write to a system registry or to a file to the virtual file. Sandboxing module 110 may then filter reads by the process through the virtual file. For example, sandboxing module 110 may intercept an attempt by the process to write to a configuration file. Sandboxing module 110 may apply the write instead to the virtual file. The process may later attempt to read from the configuration file. Instead of fulfilling the read attempt from the configuration file, sandboxing module 110 may fulfill the read attempt from the virtual file to provide the process with a view of the configuration file consistent with the earlier write attempt.

Using FIG. 4 as an example, sandboxing module 110 may redirect intercepted write attempts by process 432 to a virtual file 434 (e.g., instead of allowing the process to perform the write attempts on system registry 440 and/or file system 450). If process 432 later attempts to read from system registry 440 or file system 450, sandboxing module 110 may first pass the read attempt through virtual file 434. Any read attempts and/or portions of read attempts not fulfilled by virtual file 434 may then be fulfilled by system registry 440 and/or file system 450.

Generally, sandboxing module 110 may use any virtualization methods, systems, and/or techniques to sandbox the process. For example, sandboxing module 110 may sandbox the process by invoking a sandboxing function of a separate virtualization system.

In some examples, sandboxing module 110 may sandbox a call to a library invoked by the process. For example, the process may invoke a method in a trusted library, and sandboxing module 110 may intercept and isolate file system writes and/or registry changes attempted by the library in response to the invocation by the process. Additionally or alternatively, the process may attempt inter-process communication with a trusted process. Sandboxing module 110 may, in some examples, then sandbox the trusted process.

In some examples, sandboxing module 110 may sandbox the process alone and not any other process. For example, instead of virtualizing an entire operating system, sandboxing module 110 may apply a sandbox only to the process (e.g., because only the process was determined to be untrusted). Accordingly, other processes may initiate and run outside of the sandbox before, during, and/or after the course of execution of the process. These other processes may therefore be able to directly access system resources while the process runs within the sandbox.

Additionally or alternatively, sandboxing module 110 may sandbox the process without sandboxing any process instantiated from trusted executable files launched from the same operating environment as the executable file. For example, sandboxing module 110 may sandbox only the process and any other untrusted process launched from the same operating environment (e.g., the same computing system and/or operating system). Sandboxing module 110 may leave processes from trusted executable files to execute as normal, outside of any sandbox.

Using FIG. 4 as an example, the systems described herein may identify an executable file 460 with a reputation 470. These systems may determine, based on reputation 470, that executable file 460 is trusted. Accordingly, sandboxing module 110 may allow a process 480 instantiated from executable 460 to execute without sandboxing process 480. Accordingly, process 480 may write to system registry 440 and/or file system 450. Process 432 and process 480 may run at the same time. While the systems described herein may dynamically sandbox process 432 upon determining that executable file 410 is untrusted based on reputation 420, these systems may allow process 480 to run without any virtualization.

Returning to step 108, in some examples, sandboxing module 110 may sandbox the process for a single session. For example, sandboxing module 110 may virtualize and store changes made by the process while the process runs and then discard these changes when the process terminates. Additionally or alternatively, sandboxing module 110 may sandbox the process across sessions. For example, changes sandboxing module 110 may save changes made by the process even after the process terminates for use when the executable file is launched again. After step 308, method 300 may terminate.

By dynamically sandboxing untrusted programs based on their reputation, the systems and methods described herein may provide protection against malware as needed without sandboxing an entire system (thereby potentially consuming more computing resources) or modifying applications (e.g., by repackaging them as virtualized applications). Accordingly these systems and methods may automatically and dynamically provide sandboxing for programs as needed without performing unnecessary virtualization operations.

Figure 5:
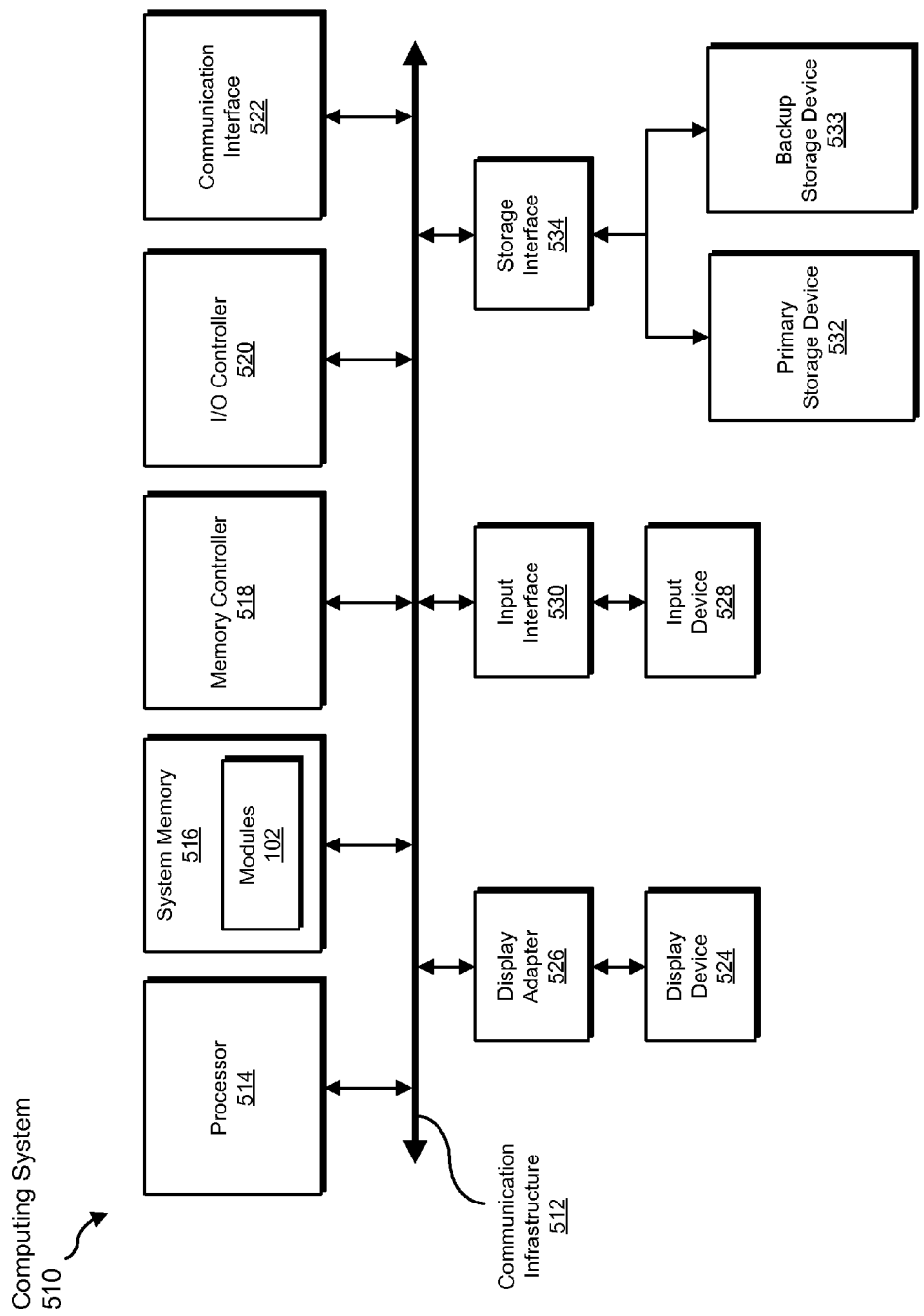
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, transmitting, receiving, determining, intercepting, making, fulfilling, creating, and/or sandboxing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, transmitting, receiving, determining, intercepting, making, fulfilling, creating, and/or sandboxing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, transmitting, receiving, determining, intercepting, making, fulfilling, creating, and/or sandboxing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, transmitting, receiving, determining, intercepting, making, fulfilling, creating, and/or sandboxing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, transmitting, receiving, determining, intercepting, making, fulfilling, creating, and/or sandboxing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, transmitting, receiving, determining, intercepting, making, fulfilling, creating, and/or sandboxing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
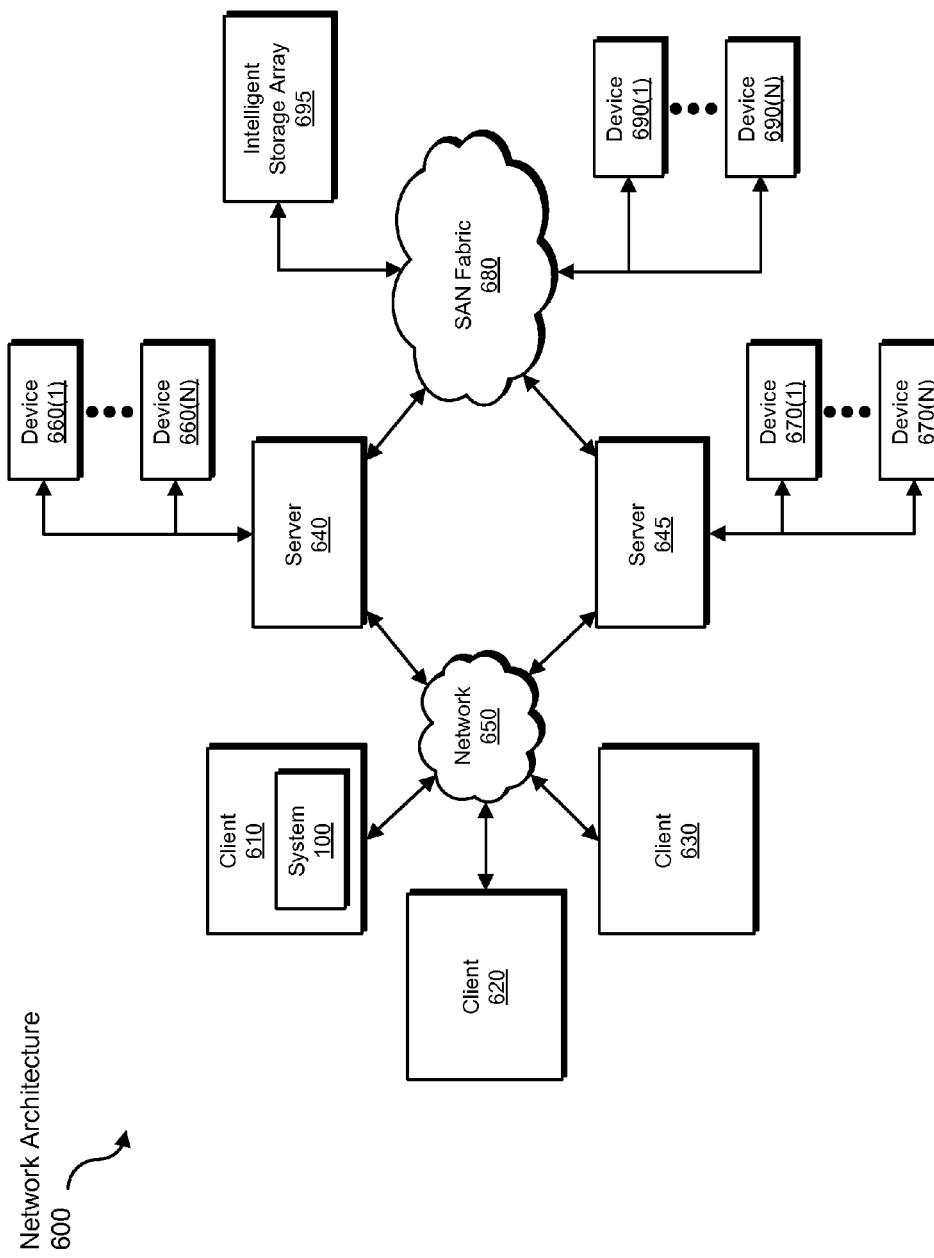
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, transmitting, receiving, determining, intercepting, making, fulfilling, creating, and/or sandboxing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for safely executing programs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of the systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a process into a sandboxed process. As another example, one or more of the modules described herein may transform a computing system into a computing system for safely executing programs.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for safely executing programs, at least a portion of the method being performed by a computing device comprising at least one processor, the method comprising:

identifying an attempt to launch an executable file;

identifying a reputation associated with the executable file;

determining, based on the reputation, that the executable file is not trusted without determining that the executable file is malicious based on a reputation score that indicates that the executable file may be malicious, wherein a favorable reputation score indicates that at least one of a file and a source of a file is generally trusted within a community and an unfavorable reputation score indicates that at least one of a file or source of a file is generally untrusted within a community;

in response to determining that the executable file is not trusted without determining that the executable file is malicious, fulfilling the attempt by sandboxing a process instantiated from the executable file, wherein sandboxing the process instantiated from the executable file comprises imposing a filter on interactions between the process and a resource of the computing device by, when the process attempts to write to the resource, redirecting the write attempt to a virtual file;

sandboxing the process across sessions by saving the virtual file after the process terminates for use when the executable file is subsequently executed and by:

intercepting at least one attempt by the process to change a system state, the system state comprising the resource of the computing device;

making a record of the attempted change in the virtual file;

intercepting at least one subsequent attempt by the process to inspect the system state;

fulfilling the subsequent attempt to inspect the system state with the record of the attempted change from the virtual file;

allowing attempts by the process to create, in a system registry, settings that pertain only to an application represented by the executable file.

2. The computer-implemented method of claim 1, wherein identifying the reputation associated with the executable file comprises identifying a percentage of user devices within a community that contain an instance of the executable file.

3. The computer-implemented method of claim 1, wherein determining that the executable file is not trusted is further based on identifying suspicious signatures in the executable file.

4. The computer-implemented method of claim 1, wherein sandboxing the process comprises sandboxing a call to a library invoked by the process and the resource of the computing device comprises the library.

5. The computer-implemented method of claim 1, wherein sandboxing the process comprises invoking a sandboxing function of a separate virtualization system.

6. The computer-implemented method of claim 1, wherein sandboxing the process comprises sandboxing the process without sandboxing any processes instantiated from trusted executable files launched from a same operating environment as the executable file.

7. The computer-implemented method of claim 1, wherein:

identifying the reputation associated with the executable file comprises identifying community-generated reputation data associated with the executable file;

the community-generated reputation data indicates whether the executable file is generally trusted or untrusted within a community of users.

8. The computer-implemented method of claim 7, wherein identifying community-generated reputation data associated with the executable file comprises:
receiving information from a plurality of clients of a security software publisher regarding the executable file, the plurality of clients comprising the community of users;
using the information from the plurality of clients to establish a reputation of the executable file that indicates whether the file is generally trusted or untrusted within the community of users.

9. A system for safely executing programs on a computing device comprising system resources, the system comprising:
an identification module programmed to identify an attempt to launch an executable file;
a reputation module programmed to identify a reputation associated with the executable file;
a determination module programmed to determine, based on the reputation, that the executable file is not trusted without determining that the executable file is malicious based on a reputation score that indicates that the executable file may be malicious, wherein a favorable reputation score indicates that at least one of a file and a source of a file is generally trusted within a community and an unfavorable reputation score indicates that at least one of a file or source of a file is generally untrusted within a community;
a sandboxing module programmed to, in response to determining that the executable file is not trusted without determining that the executable file is malicious, fulfill the attempt by sandboxing a process instantiated from the executable file, wherein sandboxing the process instantiated from the executable file comprises imposing a filter on interactions between the process and a resource of the computing device by, when the process attempts to write to the resource, redirecting the write attempt to a virtual file;
wherein the sandboxing module is further programmed to sandbox the process across sessions by saving the virtual file after the process terminates for use when the executable file is subsequently executed and by:
intercepting at least one attempt by the process to change a system state, the system state comprising the resource of the computing device;
making a record of the attempted change in the virtual file;
intercepting at least one subsequent attempt by the process to inspect the system state;
fulfilling the subsequent attempt to inspect the system state with the record of the attempted change from the virtual file;
allowing attempts by the process to create, in a system registry, settings that pertain only to an application represented by the executable file;
at least one processor configured to execute the identification module, the reputation module, the determination module, and the sandboxing module.

10. The system of claim 9, wherein the identification module is programmed to identify the reputation associated with the executable file comprises identifying a percentage of user devices within a community that contain an instance of the executable file.

11. The system of claim 9, wherein the determination module is programmed to determine that the executable file is not trusted based on identifying suspicious signatures in the executable file.

12. The system of claim 9, wherein the sandboxing module is programmed to sandbox the process by sandboxing a call to a library invoked by the process and the resource of the computing device comprises the library.

13. The system of claim 9, wherein the sandboxing module is programmed to sandbox the process by invoking a sandboxing function of a separate virtualization system.

14. The system of claim 9, wherein the sandboxing module is programmed to sandbox the process by sandboxing the process without sandboxing any processes instantiated from trusted executable files launched from a same operating environment as the executable file.

15. The system of claim 9, wherein:
the reputation module is programmed to identify the reputation associated with the executable file by identifying community-generated reputation data associated with the executable file;
the community-generated reputation data indicates whether the executable file is generally trusted or untrusted within a community of users.

16. A non-transitory computer-readable-storage medium comprising one or more computer-executable instructions that, when executed by at least one processor of a computing device, cause the computing device to:
identify an attempt to launch an executable file;
identify a reputation associated with the executable file;
determine, based on the reputation, that the executable file is not trusted without determining that the executable file is malicious based on a reputation score that indicates that the executable file may be malicious, wherein a favorable reputation score indicates that at least one of a file and a source of a file is generally trusted within a community and an unfavorable reputation score indicates that at least one of a file or source of a file is generally untrusted within a community;
in response to determining that the executable file is not trusted without determining that the executable file is malicious, fulfill the attempt by sandboxing a process instantiated from the executable file, wherein sandboxing the process instantiated from the executable file comprises imposing a filter on interactions between the process and a resource of the computing device by, when the process attempts to write to the resource, redirecting the write attempt to a virtual file; and
sandbox the process across sessions by saving the virtual file after the process terminates for use when the executable file is subsequently executed and by:
intercepting at least one attempt by the process to change a system state, the system state comprising the resource of the computing device;
making a record of the attempted change in the virtual file;
intercepting at least one subsequent attempt by the process to inspect the system state;
fulfilling the subsequent attempt to inspect the system state with the record of the attempted change from the virtual file;
allowing attempts by the process to create, in a system registry, settings that pertain only to an application represented by the executable file.

17. The non-transitory computer-readable-storage medium of claim 16, wherein identifying the reputation associated with the executable file comprises identifying a percentage of user devices within a community that contain an instance of the executable file.

18. The non-transitory computer-readable-storage medium of claim 16, wherein determining that the executable file is not trusted is further based on identifying suspicious signatures in the executable file.

19. The non-transitory computer-readable-storage medium of claim 16, wherein sandboxing the process comprises sandboxing a call to a library invoked by the process and the resource of the computing device comprises the library.

20. The non-transitory computer-readable-storage medium of claim 16, wherein sandboxing the process comprises invoking a sandboxing function of a separate virtualization system.

* * * * *